United States Patent
Ganesh et al.

(10) Patent No.: US 10,447,747 B2
(45) Date of Patent: Oct. 15, 2019

(54) VIDEO ORIENTATION NEGOTIATION

(71) Applicant: QUALCOMM Incorporated, San Diego, CA (US)

(72) Inventors: Shriram Ganesh, San Diego, CA (US); Arvind Swaminathan, San Diego, CA (US); Naveen Kalla, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 14/225,232

(22) Filed: Mar. 25, 2014

(65) Prior Publication Data
US 2015/0281300 A1 Oct. 1, 2015

(51) Int. Cl.
*H04L 29/06* (2006.01)
*H04N 7/14* (2006.01)
(Continued)

(52) U.S. Cl.
CPC .............. *H04L 65/60* (2013.01); *H04N 7/147* (2013.01); *H04N 21/2343* (2013.01);
(Continued)

(58) Field of Classification Search
CPC ................................................ H04N 21/41407
(Continued)

(56) References Cited

U.S. PATENT DOCUMENTS 7,598,948 B1 10/2009 Priem
7,658,498 B2 2/2010 Anson
(Continued)

FOREIGN PATENT DOCUMENTS

CN 101945090 A 1/2011
CN 102362471 A 2/2012
(Continued)

OTHER PUBLICATIONS

International Search Report and Written Opinion—PCT/US2015/019956—ISA/EPO—dated May 29, 2015.
(Continued)

*Primary Examiner* — Adnan M Mirza
(74) *Attorney, Agent, or Firm* — Shumaker & Sieffert, P.A.

(57) ABSTRACT

Systems, devices, and methods for orientation negotiation are described. In one innovative aspect, a method includes receiving an orientation negotiation message at a video processing device from a first device associated with a communication session with the video processing device. The orientation negotiation message includes an indication of an orientation of the first device and at least one characteristic associated with the first device. The method also includes identifying either the video processing device or the first device perform orientation processing based at least in part on the received at least one characteristic of the first device. The method further includes transmitting a message is transmitted to said first device, said message including information indicating a result of said identifying. The identified device performs subsequent orientation processing such as rotation of images included in the communication session.

24 Claims, 8 Drawing Sheets

(51) Int. Cl.
*H04N 21/2343* (2011.01)
*H04N 21/258* (2011.01)

(52) U.S. Cl.
CPC . *H04N 21/23439* (2013.01); *H04N 21/25825* (2013.01); *H04N 21/25833* (2013.01)

(58) Field of Classification Search
USPC ........................................................ 709/204
See application file for complete search history.

(56) References Cited

U.S. PATENT DOCUMENTS

| 8,803,999 | B2* | 8/2014 | Wilson .............. | H04M 1/72522 348/14.01 |
|---|---|---|---|---|
| 9,014,137 | B2 | 4/2015 | Appani et al. | |
| 9,438,818 | B2 | 9/2016 | Wang et al. | |
| 2009/0237725 | A1 | 9/2009 | Hamaguchi | |
| 2012/0230429 | A1 | 9/2012 | Boyce et al. | |
| 2012/0230594 | A1 | 9/2012 | Boyce et al. | |
| 2013/0078904 | A1 | 3/2013 | Yang | |
| 2014/0040959 | A1 | 2/2014 | Oyman | |
| 2015/0256861 | A1* | 9/2015 | Oyman .............. | H04N 21/2343 725/62 |

FOREIGN PATENT DOCUMENTS

| JP | 2013135454 A | 7/2013 |
|---|---|---|
| WO | WO-2009152099 | 12/2009 |
| WO | WO-2013100974 A1 | 7/2013 |
| WO | WO-2013192103 A1 | 12/2013 |

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Chen J., et al., "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.

* cited by examiner

VIDEO ORIENTATION NEGOTIATION

BACKGROUND

Field

The present invention relates to video communication, more specifically negotiation of orientation processing between two or more devices communicating video information.

Background

A wide range of electronic devices, including mobile wireless communication devices, personal digital assistants (PDAs), laptop computers, desktop computers, digital cameras, digital recording devices, and the like, have an assortment of image and video display capabilities.

Capturing video on such electronic devices allows pictures to be recorded at different orientations as the recording device is rotated. In some cases, the rectangular shape of the picture captured by the camera of a mobile device can make it preferable to orient the camera in a particular direction to better capture the scene information (e.g., landscape vs. portrait). However, without any information about the orientation at which the picture is captured, a display device cannot properly display the picture, e.g., the presentation of the picture may be improperly rotated or upside-down. In some scenarios, the display device cannot be physically rotated by the viewer to compensate for the rotated presentation. For example, a large fixed display like an HDTV cannot be physical rotated. Also, in the case of 2-way video conferencing calls, rotating of the display device would also rotate the camera in the device. This can be undesirable as it rotates the video being sent to the other terminal and prevents the camera from being oriented to better match the scene it is capturing. A description of representations of picture orientation can be found in the commonly assigned U.S. application Ser. No. 13/918,477, filed on Jun. 14, 2013, the entirety of which is hereby incorporated by reference.

The adjustment of the video to optimize the presentation may be performed prior to arriving at the destination device, or may be performed by the receiving device. There is a need for systems and methods for coordinating the orientation processing.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include negotiation of video orientation processing.

In one innovative aspect, a method is provided. The method includes receiving, at a video processing device, an orientation negotiation message from a first device associated with a communication session with the video processing device. The orientation negotiation message includes an indication of an orientation of the first device and at least one characteristic associated with the first device. The method also includes identifying either the video processing device or the first device to perform orientation processing. The identification is based on the received at least one characteristic of the first device. The method further includes transmitting a message to the first device. The message includes information indicating a result of the identifying.

In another innovative aspect, a video processing device is provided. The device includes a receiver configured to receive an orientation negotiation message from a first device associated with a communication session with the video processing device. The orientation negotiation message includes an indication of an orientation of the first device and at least one characteristic associated with the first device. The device further includes a negotiation message generator configured to generate a message identifying either the video processing device or the first device to perform orientation processing. The identification is based at least in part on the received at least one characteristic of the first device. The device also includes a transmitter configured to transmit the message to the first device.

In yet another innovative aspect, a video processing device is provided. The device includes means for receiving an orientation negotiation message from a first device associated with a communication session with the video processing device. The orientation negotiation message includes an indication of an orientation of the first device and at least one characteristic associated with the first device. The device also includes means for generating a message identifying either the video processing device or the first device to perform orientation processing based at least in part on the received at least one characteristic of the first device. The device also includes means for transmitting the message to the first device.

In a further innovative aspect, a non-transitory computer-readable medium including instructions executable by a processor of a video processing device is provided. The instructions, when executed by the processor, cause the video processing device to receive an orientation negotiation message from a first device associated with a communication session with the video processing device. The orientation negotiation message includes an indication of an orientation of the first device and at least one characteristic associated with the first device. The instructions further cause the device to identify either the video processing device or the first device to perform orientation processing based at least in part on the received at least one characteristic of the first device. The instructions also cause the device to transmit a message to the first device. The message includes information indicating a result of the identifying.

These and other implementations consistent with the invention are further described below with reference to the following figures.

In the figures, to the extent possible, elements having the same or similar functions have the same designations.

DETAILED DESCRIPTION

Coordinated Video Orientation (CVO) allows the sender to provide in-band signaling to the receiver to indicate if the image was captured in the same orientation as initially negotiated. The need for this information is shown in FIGS. 1A and 1B.

Figure 1A:
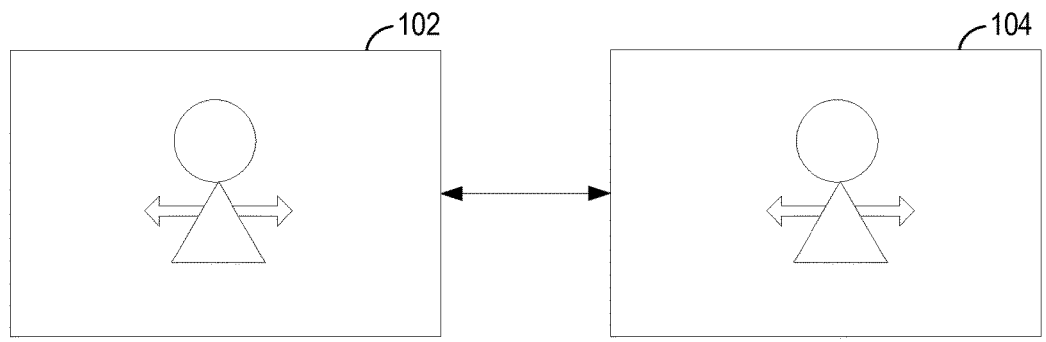
FIGS. 1A, 1B, and 1C illustrate functional block diagrams of orientation aware communication devices.

FIG. 1A shows two communication devices 102 and 104. In some implementations, the communication device transmitting the video signal may be referred to as the local end. In FIG. 1A, communication device 102 serves as the local end. The far end may be used to refer to the communication device receiving the video signal. As shown in FIG. 1A, communication device 102 and communication device 104 are oriented in landscape mode. When both the far end and local end are oriented in landscape mode, the video captured at the communication device 102 in landscape mode may be displayed in the same orientation at the communication device 104.

Figure 1B:
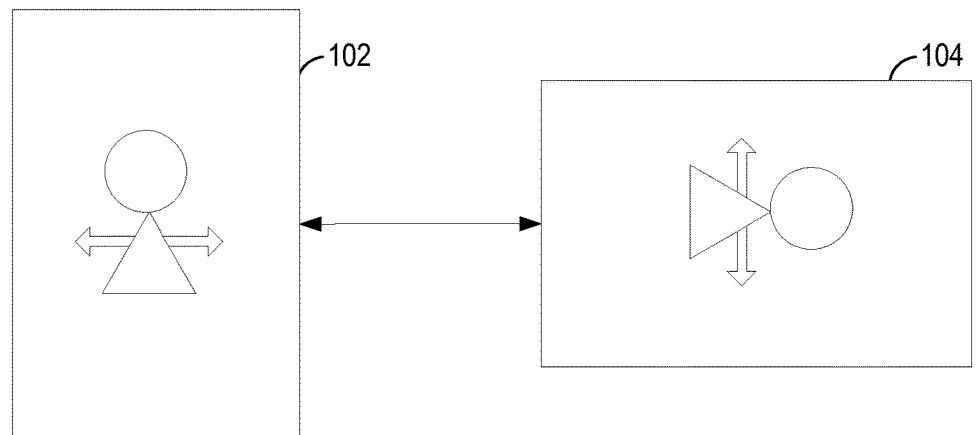

FIG. 1B shows a second configuration for the communication devices 102 and 104. As shown in FIG. 1B, the local end device 102 has been rotated 90 degrees. As a result, the local end device 102 is now in so-called portrait mode while the far end device 104 remains in landscape mode. Without adjusting the received video, the far end device 104 may be configured to render the received video horizontally as shown.

Some CVO protocols include the video orientation information in-band, such as within a real time transport protocol (RTP) stream allowing the local end to display the video correctly. However, the CVO feature places the burden on re-orienting the video always at the far end and this is not always optimal. The features described in further detail herein provide ways to enhance the efficiency and reduce the burden(s) (e.g., processor, power, time, memory, bandwidth, thermal, etc.) associated with orientation processing.

Figure 1C:
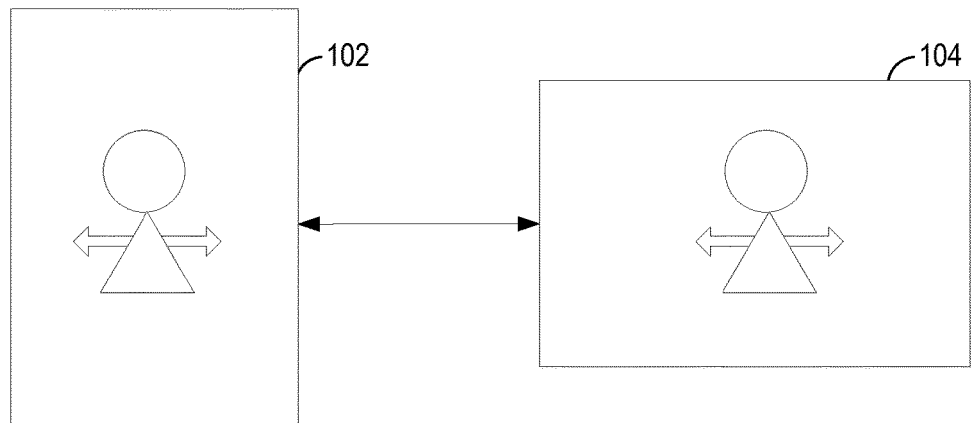

FIG. 1C shows one way in which the video image may be adjusted. As shown, the video image may be rotated. In some implementations the video image may be reduced in size to fit a landscape displayable format. It will be appreciated that the adjustment process involves the use of resources such as processor, time, power, thermal, and the like. Accordingly, it may be desirable to coordinate which device, the local end device or the far end device, will perform the orientation adjustment processing.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures, and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and messages may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

Figure 2:
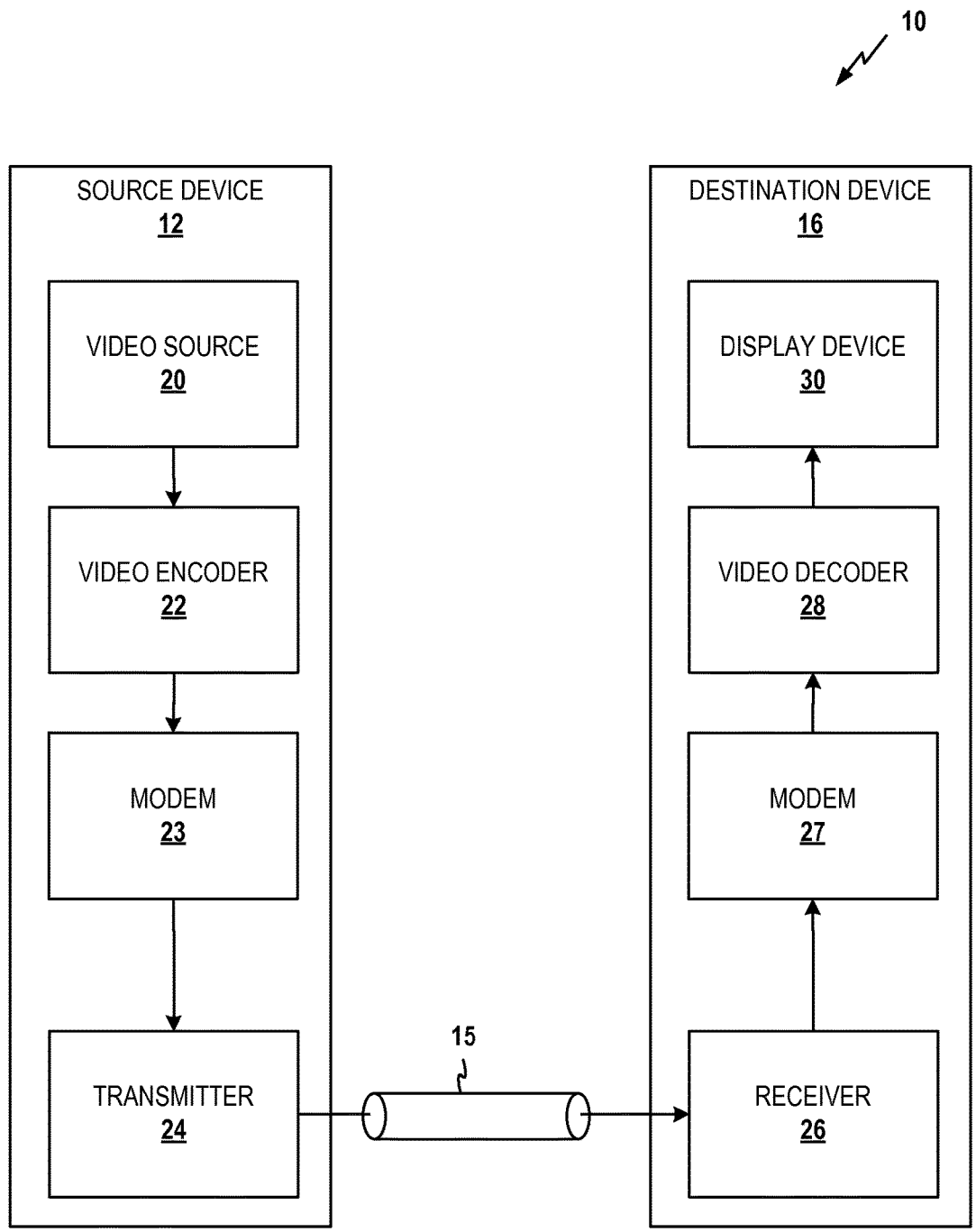
FIG. 2 illustrates a functional block diagram of an exemplary video encoding and decoding system.

FIG. 2 illustrates a functional block diagram of an exemplary video encoding and decoding system. As shown in FIG. 2, system 10 includes a source device 12 that may be configured to transmit encoded video to a destination device 16 via a communication channel 15. Source device 12 and destination device 16 may comprise any of a wide range of devices, including mobile devices or generally fixed devices. In some cases, source device 12 and destination device 16 comprise wireless communication devices, such as wireless handsets, so-called cellular or satellite radiotelephones, personal digital assistants (PDAs), mobile media players, or any devices that can communicate video information over a communication channel 15, which may or may not be wireless. Source devices may also include set-top boxes, consoles (e.g., gaming console, DVD/Blu-ray console), digital video receivers/recorders, tablet computers, handheld gaming consoles, and the like. However, the techniques of this disclosure, which concern compatible frame-packed stereoscopic three-dimensional data communications, may be used in many different systems and settings. FIG. 2 is merely one example of such a system.

In the example of FIG. 2, the source device 12 may include a video source 20, a video encoder 22, a modulator/demodulator (modem) 23 and a transmitter 24. Destination device 16 may include a receiver 26, a modem 27, a video decoder 28, and a display device 30. In accordance with this disclosure, video encoder 22 of source device 12 may be configured to encode a sequence of pictures. The video encoder 22 may be configured to encode additional information associated with the pictures such as 3D conversion information including a set of parameters that can be applied to each of the video pictures to generate 3D video data. Modem 23 and transmitter 24 may modulate and transmit wireless signals to destination device 16. In this way, source device 12 communicates the encoded sequence of pictures along with any additional associated information to destination device 16.

Receiver 26 and modem 27 receive and demodulate wireless signals received from source device 12. Accordingly, video decoder 28 may receive the sequence of pictures. The video decoder 28 may also receive the additional information which can be used for decoding the coded sequence of pictures.

Source device 12 and destination device 16 are merely examples of such coding devices in which source device 12 generates coded video data for transmission to destination device 16. In some cases, devices 12, 16 may operate in a substantially symmetrical manner such that, each of devices 12, 16 includes video encoding and decoding components. Hence, system 10 may support one-way or two-way video transmission between video devices 12, 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22. As part of the encoding process, the video encoder 22 may be configured to implement one or more of the methods described herein, such as negotiating orientation processing and performing orientation adjustment processing in view of the negotiations.

The encoded video information may then be modulated by a modem 23 according to a communication standard, e.g., such as code division multiple access (CDMA) or another communication standard, and transmitted to destination device 16 via transmitter 24. The encoded video information may include the picture orientation information. The modem 23 may include various mixers, filters, amplifiers or other components designed for signal modulation. The transmitter 24 may include circuits designed for transmitting data, including amplifiers, filters, and one or more antennas.

Receiver 26 of destination device 16 may be configured to receive information over channel 15. A modem 27 may be configured to demodulate the information. The video encoding process may implement one or more of the techniques described herein to include orientation negotiation/processing. The information communicated over channel 15 may include information defined by video encoder 22, which may be used by video decoder 28 consistent with this disclosure. Display device 30 displays the decoded video data to a user, and may comprise any of a variety of display devices such as a cathode ray tube, a liquid crystal display (LCD), a plasma display, an organic light emitting diode (OLED) display, or another type of display device.

In the example of FIG. 2, communication channel 15 may comprise any wireless or wired communication medium, such as a radio frequency (RF) spectrum or one or more physical transmission lines, or any combination of wireless and wired media. Accordingly, modem 23 and transmitter 24 may support many possible wireless protocols, wired protocols or wired and wireless protocols. Communication channel 15 may form part of a packet-based network, such as a local area network (LAN), a wide-area network (WAN), or a global network, such as the Internet, comprising an interconnection of one or more networks. Communication channel 15 generally represents any suitable communication medium, or collection of different communication media, for transmitting video data from source device 12 to destination device 16. Communication channel 15 may include routers, switches, base stations, or any other equipment that may be useful to facilitate communication from source device 12 to destination device 16. The techniques of this disclosure do not necessarily require communication of encoded data from one device to another, and may apply to encoding scenarios without the reciprocal decoding. Also, aspects of this disclosure may apply to decoding scenarios without the reciprocal encoding.

Video encoder 22 and video decoder 28 may operate consistent with a video compression standard, such as the ITU-T H.264 standard, alternatively described as MPEG-4, Part 10, and Advanced Video Coding (AVC), or the next-generation video coding standard named High Efficiency Video Coding (HEVC). The techniques of this disclosure, however, are not limited to any particular coding standard or extensions thereof. Although not shown in FIG. 2, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to a multiplexer protocol (e.g., ITU H.223) or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic circuitry, software executing on a microprocessor or other platform, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like.

A video sequence typically includes a series of video pictures. Video encoder 22 and video decoder 28 may operate on video blocks within individual video pictures in order to encode and decode the video data. The video blocks may have fixed or varying sizes, and may differ in size according to a specified coding standard. Each video picture may include a series of slices or other independently decodable units. Each slice may include a series of macroblocks or other video blocks such as coding tree units, which may be arranged into sub-blocks. As an example, the ITU-T H.264 standard supports intra prediction in various block sizes, such as 16 by 16, 8 by 8, or 4 by 4 for luma components, and 8 by 8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform or a conceptually similar transformation process.

Macroblocks, coding tree units, or other video blocks may be grouped into independently decodable units such as slices, slice groups, tiles, or other independent units. Macroblocks, coding tree units, or other video blocks may be grouped into dependently decodable units such as dependent slices, entropy slices, wavefront parallel processing waves, or other dependent units. Each slice may be an independently decodable unit of a video picture. Alternatively, pictures themselves may be decodable units, or other portions of a picture may be defined as decodable units. In this disclosure, the term "coded unit" refers to any independently decodable unit of a video picture such as an entire picture, a slice of a picture, or another independently decodable unit defined according to the coding techniques used.

Figure 3:
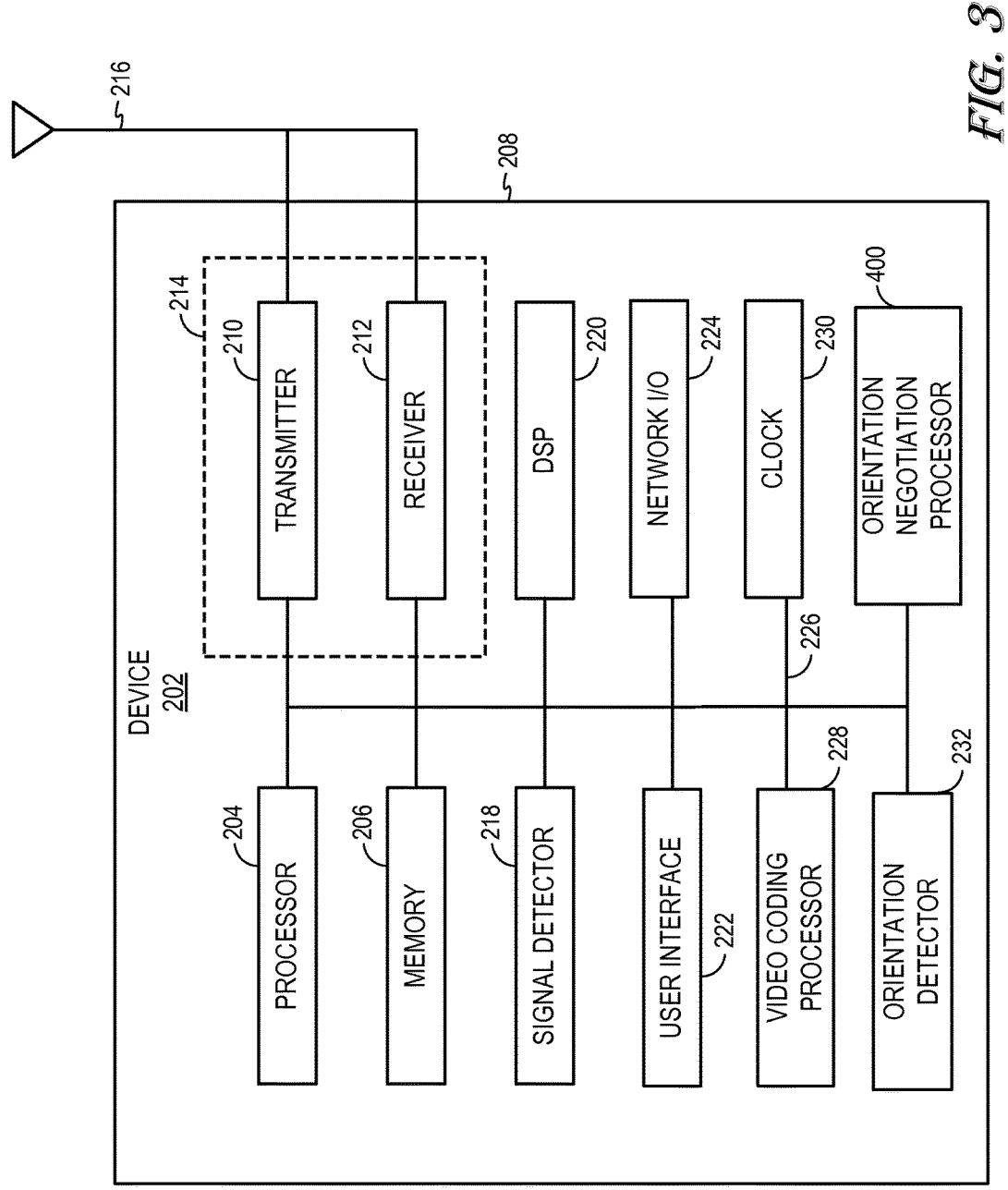
FIG. 3 shows a functional block diagram of an exemplary video processing device.

FIG. 3 shows a functional block diagram of an exemplary video processing device. The device 202 is an example of a device that may be configured to implement the various methods described herein. For example, the device 202 may be implemented as the source device 12 or the destination device 16.

The device 202 may include processor unit(s) 204 which control operation of the device 202. One or more of the processor unit(s) 204 may be collectively referred to as a central processing unit (CPU). Memory 206, which may include both read-only memory (ROM) and random access memory (RAM), provides instructions and data to the processor units 204. The memory 206 may generally be implemented as a computer readable storage medium. A portion of the memory 206 may also include non-volatile random access memory (NVRAM). The processor unit(s) 204 may be configured to perform logical and arithmetic operations based on program instructions stored within the memory 206. The instructions in the memory 206 may be executable to implement the methods described herein.

The processor unit(s) 204 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. In an implementation where the processor unit(s) 204 include a DSP, the DSP may be configured to generate a packet (e.g., a data packet) for transmission. In some aspects, the packet may comprise a physical layer data unit (PPDU).

The device 202 may also include machine-readable media for storing software. The processing unit(s) 204 may comprise one or more non-transitory machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processor unit(s) 204, cause the device 202 to perform the various functions described herein.

The device 202 may include a transmitter 210 and/or a receiver 212 to allow transmission and reception, respectively, of data between the device 202 and a remote location. The transmitter 210 and receiver 212 may be combined into a transceiver 214. An antenna 216 may be attached to the housing 208 and electrically coupled with the transceiver 214. The device 202 may also include (not shown) multiple transmitters, multiple receivers, multiple transceivers, and/ or multiple antennas.

The transmitter 210 may be configured to wirelessly transmit packets and/or signals. For example, the transmitter 210 may be configured to transmit different types of packets generated by the processor unit(s) 204, discussed above. The packets to be transmitted are provided to the transmitter 201. For example, the processor unit(s) 204 may store a packet in the memory 206 and the transmitter 201 may be configured to retrieve the packet. Once the transmitter retrieves the packet, the transmitter 201 transmits the packet to via the antenna 216. In some implementations, the transmitter 201 may transmit the packet via a network input/output 224.

If the device 202 is implemented as a destination device 16, the antenna 216 detects wirelessly transmitted packets/ signals. The receiver 212 may be configured to process the detected packets/signals and make them available to the processor unit(s) 204. For example, the receiver 212 may store the packet in memory 206 and the processor unit(s) 204 may be configured to retrieve the packet.

The device 202 may also include a signal detector 218 that may be used in an effort to detect and quantify the level of signals received by the transceiver 214. The device 202 may also include a digital signal processor (DSP) 220 for use in processing signals. The DSP 220 may be configured to generate a packet for transmission. In some aspects, the packet may comprise a physical layer data unit (PPDU).

The device 202 may further comprise a user interface 222 in some implementations. The user interface 222 may comprise a keypad, a microphone, a speaker, and/or a display. In some implementations, the device 202 may be coupled with a display. For example, the device 202 may be implemented as a set-top-box which receives video information, processes the information for display, and transmit the information to a television for display. The user interface 222 may further include any element or component that conveys information to a user of the device 202 and/or receives input from the user. The device 202 may also include a housing 208 surrounding one or more of the components included in the device 202.

The device 202 may include a video coding processor 228. When implemented as a source device 12, the video coding processor 228 may be configured to receive video data such as from one or more cameras or other image capturing device(s). The video coding processor 228 may include an encoder, such as the video encoder 22 discussed above. The video coding processor 228 may be configured to include image compatibility information in multimedia streams/files generated by the device 202. In some implementations, the video coding processor 228 may be configured to orient the video to be encoded. For example, if the video stream is captured in landscape mode but is being transmitted to a destination device in portrait orientation, the video coding processor 228 may, based on orientation negotiation and the orientation information of the receiving device, adjust the orientation of the video stream.

When implemented as a destination device 16, the video coding processor 228 may be configured to receive and decode the multimedia data and provide the data for presentation. The video coding processor 228 may include a decoder, such as the video decoder 28 described above. The video coding processor 228 included in a destination device 16 may be configured to identify multimedia data and adjust the processing of such data. The video coding processor 228 may, based on orientation negotiation and the orientation information of the device, adjust the orientation of the video stream.

The device 202 may further include an orientation negotiation processor 400. The orientation negotiation processor 400 may be configured to negotiate with one or more devices orientation processing for a video session (e.g., video telephony, video broadcast). The orientation negotiation processor 400 will be shown and described in further detail with reference to FIG. 4 below. The orientation information may be provided to the video coding processor 228.

The device 202 may include a clock 230. The clock 230 may be configured to identify a point in time. The clock 230 may identify absolute points in time (e.g., specific date and time information). The clock 230 may be configured to identify relative points in time (e.g., points in a multimedia presentation). The clock 230 may be coupled with the capture sensor included in a source device 12. The clock 230 may provide time information at various points of video capture. This time information may be included in the video information transmitted to the destination device 16.

The device 202 may include an orientation detector 232. The orientation detector 232 may be configured to provide orientation information for the device 202. For example, the orientation detector 232 may include a gyroscope. The orientation detector 232 may, in some implementations, provide a value indicating a number of degrees of rotation of the device 202.

The various components of the device 202 may be coupled together by a bus system 226. The bus system 226 may include a data bus, for example, as well as a power bus, a control signal bus, and a status signal bus in addition to the data bus. Those of skill in the art will appreciate the components of the device 202 may be coupled together or accept or provide inputs to each other using some other mechanism.

Although a number of separate components are illustrated in FIG. 3, those of skill in the art will recognize that one or more of the components may be combined or commonly implemented. For example, the processor unit(s) 204 may be used to implement not only the functionality described above with respect to the processor unit(s) 204, but also to implement the functionality described above with respect to the signal detector 218. As a second example, the video coding processor 228 may include the orientation negotiation processor 300. Further, each of the components illustrated in FIG. 3 may be implemented using a plurality of separate elements.

Figure 4:
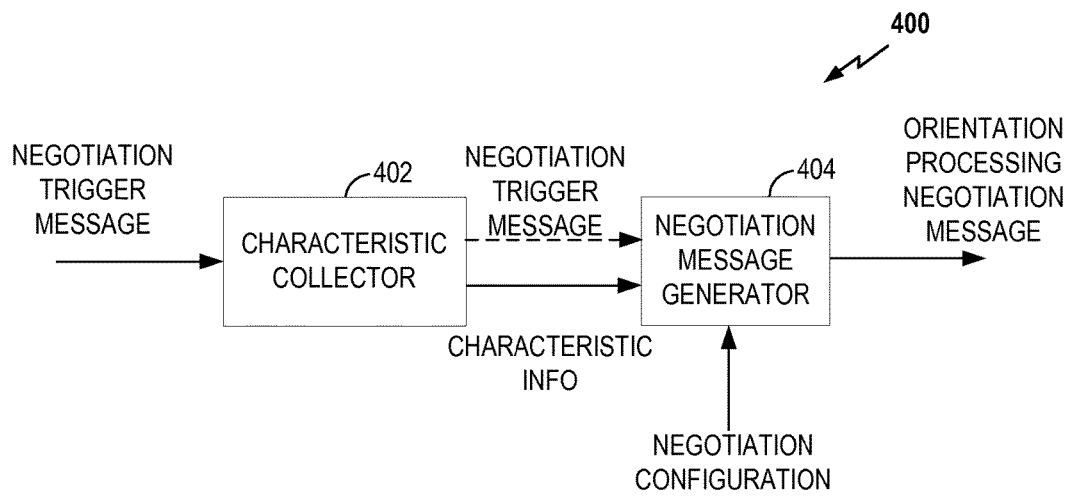
FIG. 4 illustrates a functional block diagram of an exemplary orientation negotiation processor.

FIG. 4 illustrates a functional block diagram of an exemplary orientation negotiation processor. The orientation negotiation processor 400 shown in FIG. 4 receives a negotiation trigger message as one input. The negotiation trigger message may be a clock signal indicating the time for negotiation. In some implementations, a more complex negotiation trigger message may be provided to the orientation negotiation processor 400. For example, the processor unit(s) 204 may identify a characteristic in a received message from another device included in a communication session. Based on this identification, the processor unit(s) 204 may transmit the negotiation trigger message to the orientation negotiation processor 400 to initiate the negotiation process. In some implementations, device events such as power on, power change, temperature fluctuation, memory utilization, handoff, connectivity, and the like may be detected and cause a negotiation trigger message to be generated.

The characteristic collector 402 may be included in the orientation negotiation processor 400. Upon receiving the negotiation trigger message, the characteristic collector 402 may be configured to identify one or more characteristic values. The characteristic values may be associated with the device which includes the orientation negotiation processor 400. The characteristic values may be associated with a network to which the device which includes the orientation negotiation processor 400 is connected to. The characteristic values may be associated with another device included in the communication session with the device which includes the orientation negotiation processor 400. The values may be obtained by transmitting a characteristic request and receiving a characteristic response. The values may be obtained from a memory which stores the values for the characteristics over time. The values may be provided to the memory by the characteristic source.

In some implementations, the negotiation trigger message may include the characteristic values. In such implementations, the characteristic collector 402 may identify the characteristic values by parsing the negotiation trigger message.

The characteristic may include battery level, processing unit (e.g., central processing unit or graphic processing unit) capability (e.g., clock cycle(s), chipset, memory rotation, thermal efficiency, operating system, instruction set), device power source, orientation sensor capability, thermal conditions, transmission power, participant (e.g., sender/receiver) identifier (e.g., phone number, name, etc.), or the like. The characteristic information may include cached characteristic information. In such implementations, once characteristic information is obtained, the value may be associated with a duration during which subsequent requests for the value may be fulfilled from the cache rather than from another characteristic information source.

The characteristics are provided to an orientation negotiation message generator 404. In some implementations, the negotiation trigger message may also be provided to the orientation negotiation message generator 404. The orientation negotiation message generator 404 may also be configured to receive one or more negotiation configurations. A negotiation configuration may include thresholds or ranges of values for characteristics which may be used to determine whether the device including the orientation negotiation processor 400 is to perform orientation processing. For example, one negotiation configuration may be a minimum percent of battery life available to perform orientation processing. A negotiation configuration may be expressed in relative terms. For example, a negotiation configuration may specify that a device is to perform orientation processing if the difference between its percent of battery life and a far end device's battery life exceeds a threshold. Other negotiation configurations may be provided consistent with the features and characteristics described above.

The negotiation configuration may be pre-loaded in the negotiation processor 400 such as in a memory. In some implementations, the negotiation configuration may be updated such as via over the air provisioning or back haul signaling. The negotiation configuration may, in some implementations, be specified by the user as a preference.

The negotiation message generator 404 may perform one or more functions. First, the negotiation message generator 404 determines whether the device associated with the characteristic information can perform orientation processing. Second, the negotiation message generator 404 may be configured to generate a message including a value indicating the result of the determination. In some implementations, the orientation message generator 404 may simply provide the determination result as the output message.

Based on the received characteristics and, optionally, the negotiation trigger message and/or negotiation configuration parameters, the negotiation message generator 404 generates an orientation processing negotiation message. The orientation processing negotiation message includes one or more values indicating whether the device is to perform orientation processing. In some implementations, the orientation processing negotiation message is provided to the processor unit(s) 204 for transmission via the transmitter 201 to the other devices included in the communication session. The message may be sent as generated by the negotiation message generator 404. In some implementations, the orientation processing negotiation message may be included in another message such as a SIP message transmitted as part of set up or session maintenance. In some implementations, the orientation processing negotiation message may be further parsed by the local device and the information from message may be used to generate another message for transmission to the devices included in the communication session.

Figure 5:
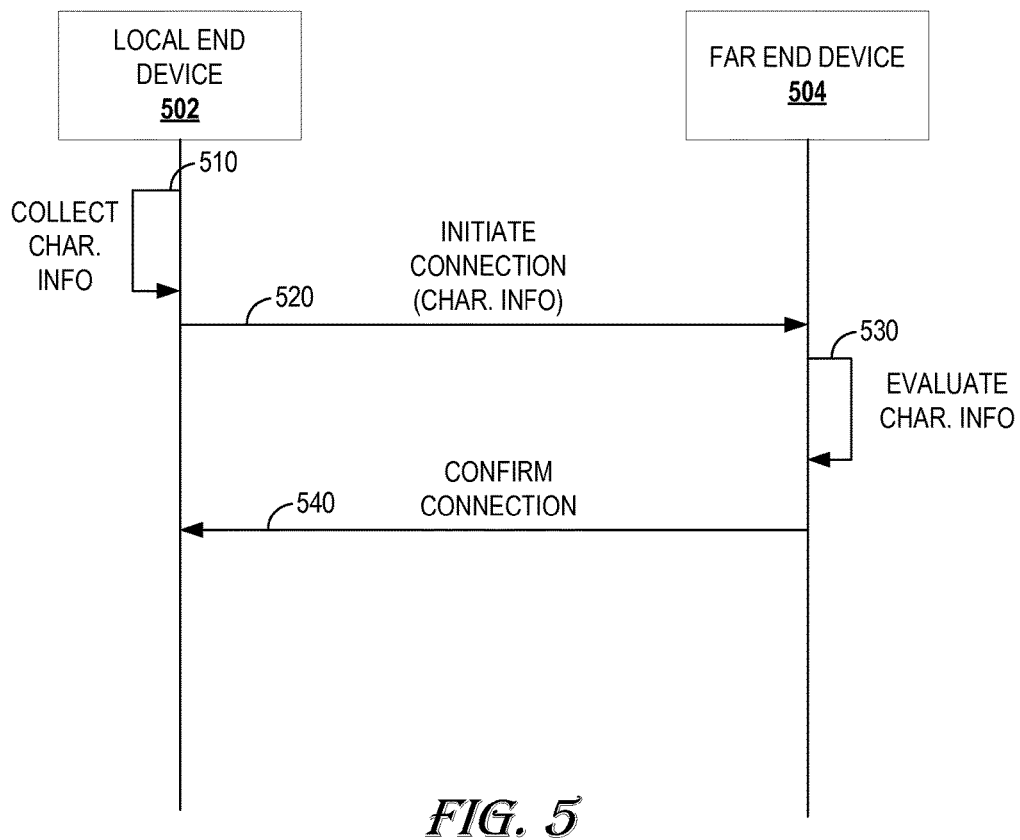
FIG. 5 shows a call flow diagram for an example communication session between a local end device and a far end device.

FIG. 5 shows a call flow diagram for an example communication session between a local end device and a far end device. The call flow shown in FIG. 5 may be implemented by one or more of the devices described herein such as that shown in FIG. 2 or 3. The call flow shown in FIG. 5 illustrates two entities, a local end device 502 and a far end device 504. It will be understood that while the messages are shown as being exchanged directly between the local end device 502 and the far end device 504, in some implementations, additional entities may be included between the two end devices.

The local end device 502 detects a trigger message. The trigger message may be, for example, the initiation of a call. The local end device 502 collects orientation and characteristic information at call 510. As shown in FIG. 5, the local end device 502 collects the orientation and characteristic information from itself. In some implementations, the collection at call 510 may include a request to another device included in the communication session or to be included in the communication session. The call 510 includes messaging with another server such as a network controller or other central repository of information.

Once collected, via call 520, the communication connection is initiated. The initiation message includes the collected orientation information. In some implementations, the initiation message includes at least a portion of the collected characteristic information. In some implementations, the initiation message may include a value indicating whether the local end device 502 can perform orientation processing.

Upon receipt, the far end device 504 evaluates the initiation message. The far end device 504 may perform a collection of its own characteristic information via call 530. The far end device 504 may then evaluate its characteristic information, if collected, along with any characteristic information received from the local end device 502 to determine whether it can perform orientation processing. In some implementations, the far end device 504 may determine, based on a value indicating whether the local end device 502 can perform orientation processing, that the local end device 502 can perform orientation processing. In such implementations, further collection and evaluation of characteristics at the far end device 504 may be omitted.

The far end device 504 is configured to provide a connection confirmation message via call 540. The connection confirmation may include a value indicating the result of the evaluation (e.g., whether the far end device 504 agrees with the determination of the local end device 502 or proposes an alternate orientation processing arrangement). The connection confirmation message may also include orientation information for the far end device 504. This orientation information may be used by the local end device 502 should the responsibility of orientation processing fall to it.

Figure 6:
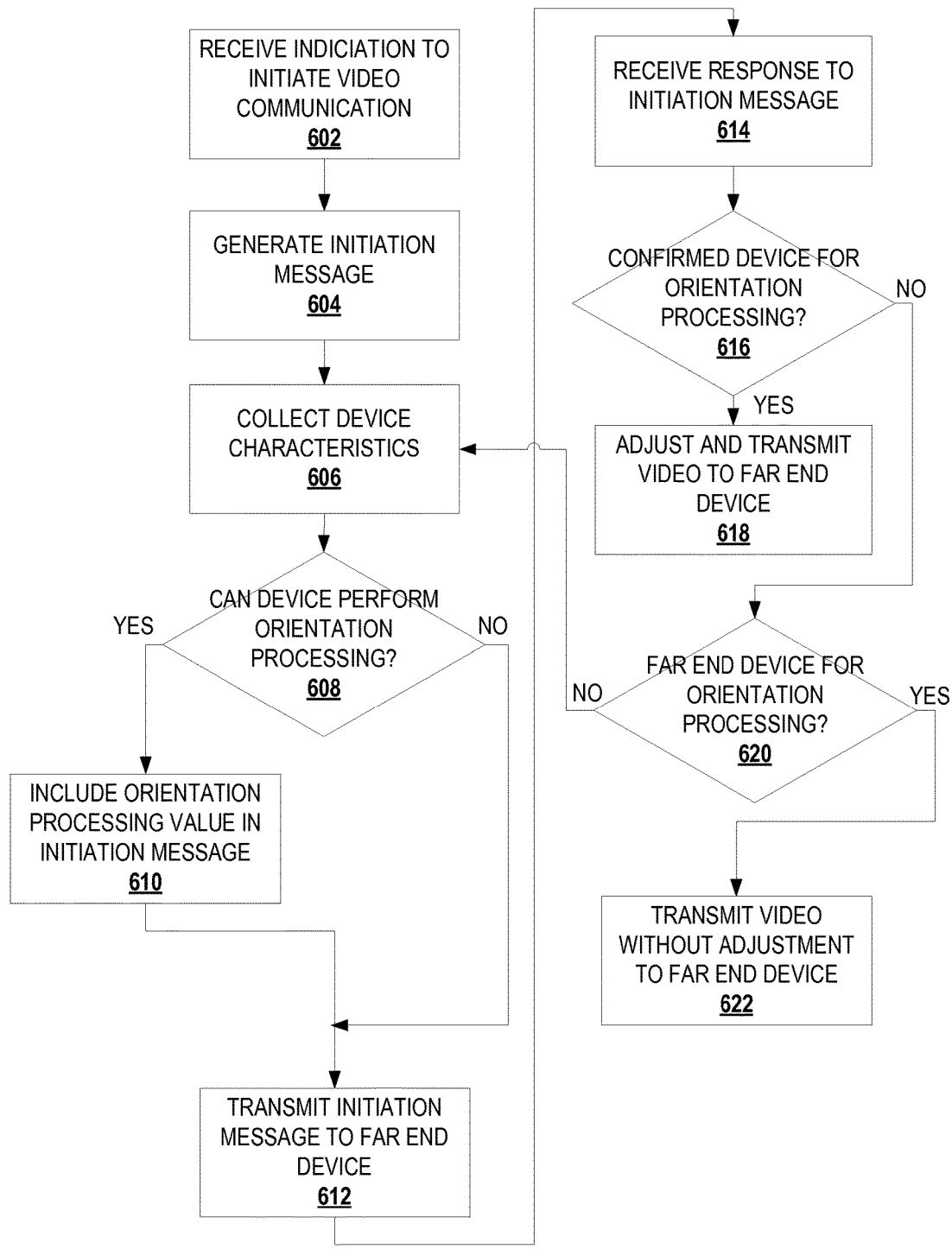
FIG. 6 shows a process flow diagram for an example of a method of orientation processing negotiation.

FIG. 6 shows a process flow diagram for an example of a method of orientation processing negotiation. The method shown in FIG. 6 may be implemented in one or more of the devices described herein, such as the video coding device shown in FIG. 2 or 3.

At node 602, a signal to initiate video communication is received. For example, a user of a device may provide an input indicting a contact to initiate a video call with.

At node 604, an initiation message is generated. The initiation message may be a generated in accordance with a communication protocol such as SIP, RTP, and the like. Instructions may be provided which allow processor unit(s) to format the initiation message according to the selected communication protocol. The protocol may be identified based on, for example, the contact to which the session is being established.

At node 606, device characteristics are collected. As discussed above, the device characteristics can include battery level, processing unit (e.g., central processing unit or graphic processing unit) capability (e.g., clock cycle(s), chipset, memory rotation, thermal efficiency, operating system, instruction set), device power source, orientation sensor capability, thermal conditions, transmission power, sender/receiver identifier, or the like. The collection may include querying one or more elements included in the device. The collection may include transmitting request and receiving a response for a characteristic.

At node 608, a determination is made as to whether the device can perform orientation processing. The determination is based at least in part on the characteristics as discussed above. In some implementations, the determination may be made based on the characteristic information included in a received orientation negotiation message. For example, a far end device may transmit a request to initiate a communication session to a near end device. The request may include one or more characteristics of the far end device. The receiving device may include one or more rules which indicate how to evaluate the far end device characteristics. For example, if the far end device is operating using an external power source, it may be selected to perform orientation processing because its power source is more reliable and less likely to be depleted by orientation processing. In some implementations, the determination may include comparing characteristic information for the near end device to that of the far end device. For example, the near end device may include a first graphics processing unit (GPU) and the near end device may include a second graphics processing unit. The rules may include a list of GPUs for performing orientation processing which is organized such that comparing the location of one GPU in the list to another GPU in the list can provide an indication of the GPU which is more efficient at performing orientation processing. The rules may be processed in isolation (e.g., only one rule applied), or be logically organized to provide a more sophisticated determination. One example of logical organization is a decision tree. The rules within the decision tree may be organized using an initial characteristic comparison such as power source and descending through the various options for other device characteristics. As will be understood, the representation of rules can take many forms, but irrespective of form, the intent of the rules is to provide a determination of a device to perform negotiation orientation processing.

At node 610, if it is determined that the device can perform orientation processing, a value identifying that the device can perform orientation processing is included in the initiation message. In one implementation, the information may be included in a header field of the initiation message. In one implementation, the information may be included in an information element of the initiation message. How this value is provided is not limited to these examples. One non-limiting advantage of the described features is that an orientation negotiation determination value is provided as part of the session initiation process.

At node 612, the initiation message is transmitted to the identified receiving device. Returning to decision node 608, if it is determined that the device cannot perform orientation processing, the process flow continues to node 612 to transmit the initiation message without an orientation processing value. In some implementations, it may be desirable to include a value indicating a negative determination in the initiation message. In such implementations, a value identifying such a condition may be included in the initiation message.

At node 614, a response is received to the initiation message transmitted at node 612. The response may include an orientation processing negotiation message along with orientation information for the transmitting device.

At node 616, a determination is made as to whether the orientation processing has been confirmed. If orientation processing is confirmed for the receiving device, the process continues to node 618 to perform orientation processing. The orientation processing at node 618 configures the device to adjust video based at least in part on the received orientation information.

Returning to determination node 616, if orientation processing for the receiving device has not been confirmed, the process continues to node 620. At node 620, a determination is made as to whether the initiation confirmation message indicates the far end will perform orientation processing. If so, the process continues to node 622 where the video is transmitted without adjustment prior to transmission. If not, the process may return to node 606 to repeat characteristic collection and further orientation processing negotiation.

FIG. 6 shows how negotiation of orientation processing may be performed prior to or during communication session initiation. Similar features may be included to allow re-negotiation of orientation processing as device characteristics change.

Figure 7:
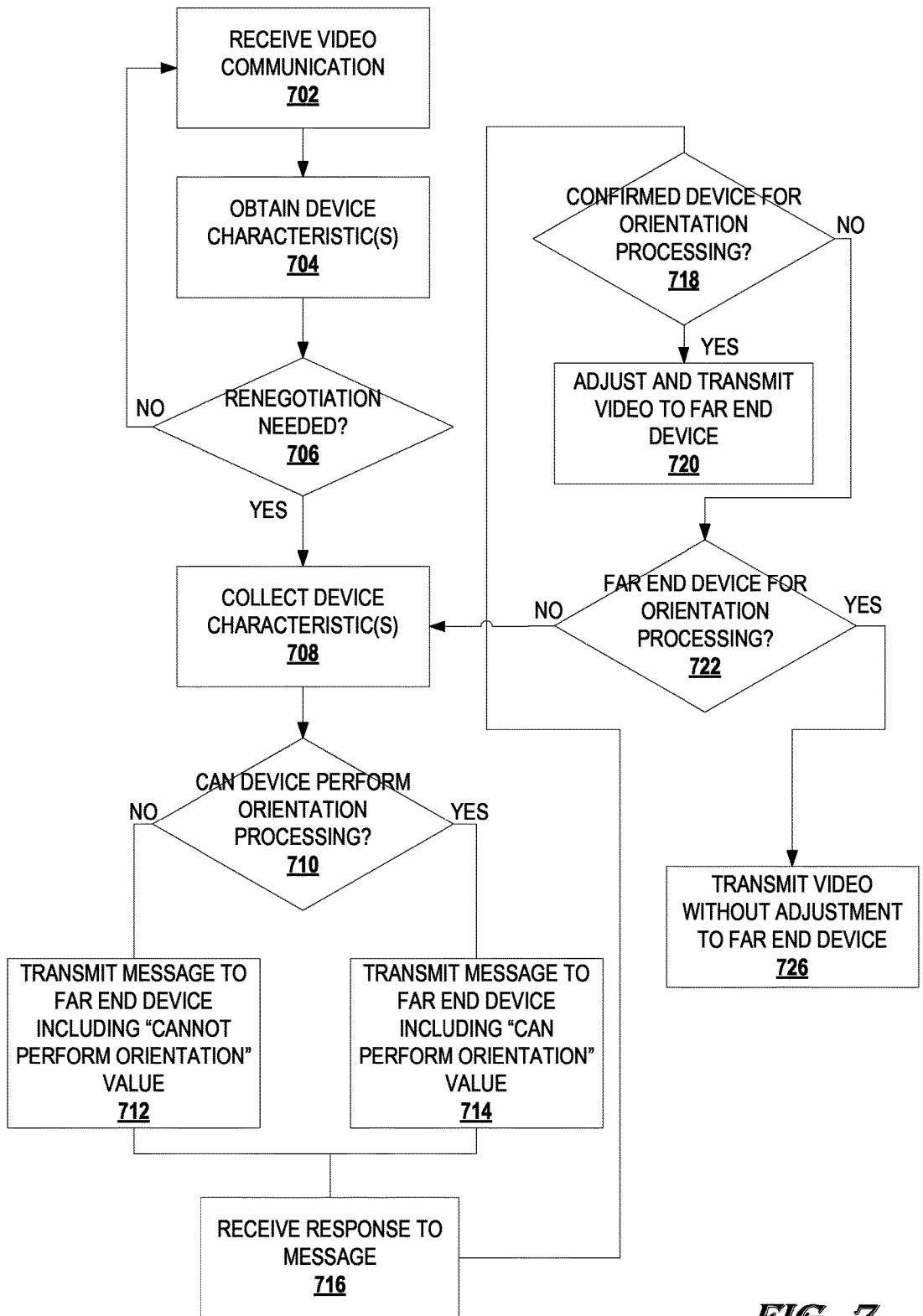
FIG. 7 shows a process flow diagram for an example of a method of orientation processing re-negotiation.

FIG. 7 shows a process flow diagram for an example of a method of orientation processing re-negotiation. The method shown in FIG. 7 may be implemented in one or more of the devices described herein, such as the video coding devices shown in FIG. 2 or 3.

At node 702, video communication is received. The video communication may be encoded in accordance with one or more video standards and transmitted using a transport protocol suitable for video communications such as SIP or RTP. A negotiation trigger message may be included in-band with the video communication. In some implementations, the negotiation trigger message may be received out of band, separate from the video communication.

At node 704, one or more device characteristics are received. The device characteristic may be, for example, a change in battery level.

At node 706, a determination is made as to whether orientation re-negotiation is needed. The decision may be based on the video communication or the negotiation trigger message. In some implementations, the trigger may be the receipt of a characteristic at node 704. The determination may include identifying whether the currently negotiated orientation processing is the same as previously negotiated orientation processing. Table 1 below shows an example re-negotiation decision look-up table for a local end device.

TABLE 1

| Previously Negotiated Orientation Processor | Can Local End Perform Orientation Processing? | Re-negotiate? |
| --- | --- | --- |
| Far end | Yes | No |
| Far end | No | No |
| Local end | Yes | No |
| Local end | No | Yes |

If the determination at node 706 indicates that no re-negotiation is needed, the process returns to node 702 to receive further video communications. If the determination is made at node 706 that re-negotiation is needed, the process continues to node 708, where device characteristics are collected similar to node 606 in FIG. 6. At node 710, a determination is made as to whether the device can perform orientation processing. The determination is based at least in part on the characteristics as discussed above.

If it is determined that the device can perform orientation processing, at node 712, a value identifying that the device can perform orientation processing is transmitted to the other device. This may be transmitted in-band with video transmission or out-of-band. As noted above, how this value is provided is not limited to these examples. One non-limiting advantage of the described features is that an orientation negotiation determination value is provided during an active communication session.

Returning to decision node 710, if it is determined that the device cannot perform orientation processing, the process flow continues to node 714 to transmit a value identifying that the device cannot perform orientation processing. In some implementations, it may be desirable to include a value indicating a negative determination in the initiation message. In such implementations, a value identifying such a condition may be included in the initiation message. In some implementations, the inability to perform orientation processing may be indicated by the absence of orientation negotiation information in a message.

At node 716, a response is received. The response may include an orientation processing negotiation message along with orientation information for the transmitting device. As discussed above, the response may be included in-band with video or out-of-band.

At node 718, a determination is made as to whether the orientation processing has been confirmed. If orientation processing is confirmed for the receiving device, the process continues to node 720 to perform orientation processing. The orientation processing at node 720 configures the device to adjust video based at least in part on the received orientation information.

Returning to determination node 718, if orientation processing for the receiving device has not been confirmed, the process continues to node 722. At node 722, a determination is made as to whether the received response message indicates the far end will perform orientation processing. If so, the process continues to node 726 where the video is transmitted without adjustment prior to transmission. If not, the process may return to node 708 to repeat characteristic collection and further orientation processing negotiation.

Figure 8:
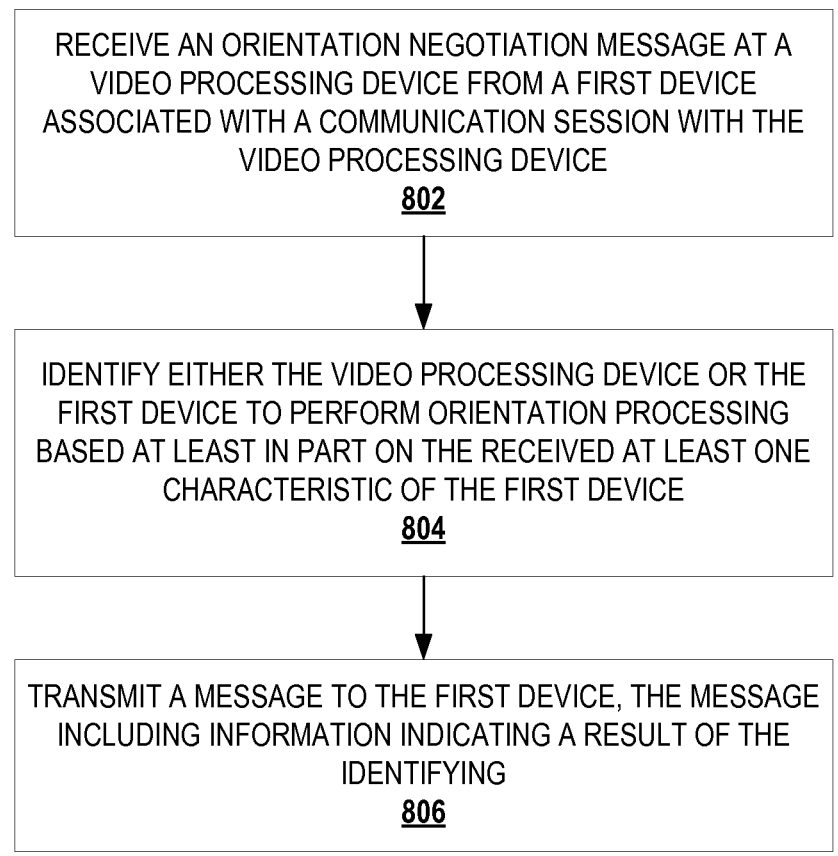
FIG. 8 shows a process flow diagram for a method of orientation negotiation.

FIG. 8 shows a process flow diagram for a method of orientation negotiation. The method shown in FIG. 8 may be implemented in one or more of the devices described herein, such as the video coding device shown in FIG. 2.

At node 802, an orientation negotiation message is received at a video processing device from a first device associated with a communication session with the video processing device. The orientation negotiation message includes an indication of an orientation of the first device and at least one characteristic associated with the first device. At node 804, either the video processing device or the first device is identified to perform orientation processing based at least in part on the received at least one characteristic of the first device. At node 806, a message is transmitted to said first device, said message including information indicating a result of said identifying.

As a further example application of the aspects described, some devices may be configured to use real-time transport protocol packet switch stream streaming. The devices may be configured to receive, decode, and render certain formats such as video data including frame-packing arrangement SEI messages. In such implementations, the receiving, decoding, and rendering of the video bit-stream may be expedited upon identification of the negotiation orientation information. For example, when the orientation negotiation information is detected and the far end device is identified as the orientation processor, the receiving pipeline may be configured to bypass orientation processing.

Having discussed several aspects of orientation negotiation, several examples of negotiation determination for a few characteristics are presented below.

For example, the characteristic may include current battery level. Current battery level. If the far end device is at 10% battery and the local end device is at 90% battery then the far end may advertise that it does not support CVO such as with a possible error code stating the reason as inefficient battery. The local end device may be configured to use this information to take on the responsibility for orientation processing and does the re-orientation before transmitting to the far-end.

In another example, the characteristic may be the CPU and/or GPU capability of a device. In this example, if the far end device uses a Snapdragon 800 chipset and the local end device is using a Snapdragon 200. The far end device may be configured to perform the re-orientation much more power efficiently compared to the local end device. In this scenario the far end device is configured to advertise it does not support CVO such as with a possible error code stating the reason as inefficient processor. The local end device may be configured to use this information to determine it should perform the orientation processing (e.g., re-orientation) before transmitting to the far end device.

In a further example, device power source may be the characteristic. By this example, if the far end device is a mobile device running on a small battery and the local end device is a desktop connected to a constant power source, the far end device may advertise that it does not support CVO such as with the error code as inefficient power source. In this scenario, the local end device is configured to determine, based on the received advertisement, that it should perform orientation processing of video prior to sending it to the far end device.

Yet another example characteristic may be orientation sensor capability. If one of the ends does not include orientation sensor capability, it can request other end to do pre-rotation based on a received display configuration. Such an implementation may be included where one of the devices is installed in a fixed location with an orientation configuration such as a television mounted on a wall. In implementations where each end is orientation aware, it may be desirable for the end with higher quality sensor to be selected for orientation processing.

These are just several examples of the characteristics which may be used to negotiation orientation processing. Further characteristic information associated with the device, the network, weather around the device, location of the device, or the like may be considered during the negotiation. The information may be considered internally to the device or transmitted to the other devices in the communication session as part of the negotiation.

As described above, the negotiation is performed between two or more participants in a communication session. In some implementations, the negotiation determination may be performed by an intermediary between the two or more participants in the communication session. Such an implementation may be useful to allow legacy devices that may not include an orientation negotiation processor to still receive pre-oriented video tailored to the legacy device. Furthermore, it allows devices which may be capable of orientation processing but lacking a negotiation mechanism to selectively perform orientation processing to improve resource utilization.

Figure 9:
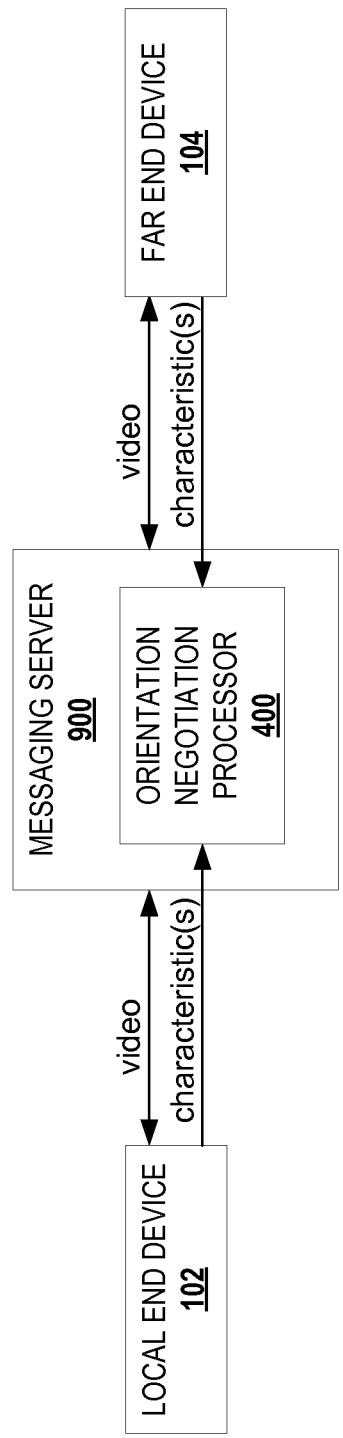
FIG. 9 shows a functional block diagram of mediated orientation processing negotiation.

FIG. 9 shows a functional block diagram of mediated orientation processing negotiation. The local end device 102 and the far end device 104 may transmit video or other multimedia communications via a messaging server 900. The messaging server 900 may be implemented and an internet messaging server, streaming media server, video telephony server, or other central communication session management server. As shown in FIG. 9, the messaging server 900 includes an orientation negotiation processor 400. The orientation negotiation processor 400 may receive characteristic information from the local end device 102 and/or the far end device 104. The orientation negotiation processor 400 may then arbitrate which device, the local end device 102 or the far end device 104, will perform orientation processing. A message indicating this determination may be provided to the device selected for orientation processing such as in-band with the video or via other messages/signals.

In an implementation where the messaging server 900 receives negotiation information from only one of the end devices, the messaging server 900 may serve as a negotiation proxy for the device lacking negotiation functionality. In such implementations, the orientation processor 400 may be configured to negotiate for the device lacking negotiation functionality remotely (e.g., not at the device lacking the functionality). In some implementations, the messaging server 400 may exchange messages with the device lacking negotiation functionality to obtain characteristic information for the device upon which the negotiation will be based.

As used herein, the terms "determine" or "determining" encompass a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components, electronic device(s) or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Similarly, the messages described above include one or more fields which may be used in various implementations. The messages may include additional fields, fewer fields, and/or alternative field arrangements without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by an encoding device and/or decoding device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method comprising:
 receiving, at a video processing device, an orientation negotiation message from a first device associated with a communication session with the video processing device, the orientation negotiation message including an indication of an orientation of the first device and a first value indicating at least one characteristic of the first device;
 receiving, at the video processing device, a second value indicating the at least one characteristic of the video processing device;

identifying the video processing device or the first device as the one to perform orientation processing of video data transmitted and received by the video processing device and the first device during the communication session, said identifying based at least in part on a comparison of the first value to the second value and based on exceeding a threshold value associated with the first device;

transmitting a first message to said first device, said first message including information indicating a result of said identifying;

identifying a change in the at least one characteristic of the video processing device during the communication session;

when the video processing device is not identified to perform orientation processing, determining whether the video processing device can perform orientation processing based on a subsequent comparison of the changed characteristic to the at least one characteristic of the first device; and upon determining the video processing device can perform orientation processing, transmitting a second message from the video processing device to the first device.

2. The method of claim 1, wherein the at least one characteristic includes at least one of: a battery level, a central processing unit capability, a power source, an orientation sensor capability, thermal conditions, transmission power, or communication session participant identifier.

3. The method of claim 2, wherein the central processing unit capability includes clock cycles, chipset, memory rotation, thermal efficiency, operating system, or instruction set.

4. The method of claim 1, wherein the orientation negotiation message is received prior to establishing the communication session.

5. The method of claim 1, wherein the orientation negotiation message is received during the communication session.

6. The method of claim 1, wherein the second message comprises an orientation re-negotiation message.

7. The method of claim 1, wherein the first message comprises one of a session initiation protocol or a real time transport protocol message.

8. The method of claim 1, further comprising:

when the video processing device was identified as the one to perform orientation processing, adjusting an orientation of video data transmitted during the communication session based at least in part on the orientation of the first device and an orientation of the video processing device; and bypassing orientation processing of the video data transmitted during the communication session when the first device is identified as the one to perform orientation processing.

9. The method of claim 8, wherein adjusting the orientation of video data includes rotating one or more portions of the video data.

10. A video processing device comprising:

a receiver configured to receive an orientation negotiation message from a first device associated with a communication session with the video processing device, the orientation negotiation message including an indication of an orientation of the first device and a first value indicating at least one characteristic of the first device;

a characteristic collector configured to obtain a second value indicating the at least one characteristic of the video processing device;

an negotiation message generator configured to generate a first message identifying the video processing device or the first device as the one to perform orientation processing of video data transmitted and received by the video processing device and the first device during the communication session, wherein generating the first message is based at least in part on a comparison of first to the second value and based on exceeding a threshold value associated with the first device;

a transmitter configured to transmit the first message to said first device, wherein the characteristic collector is further configured to identify a change in the at least one characteristic of the video processing device during the communication session, when the video processing device is not identified to perform orientation processing, the negotiation message generator is further configured to determine whether the video processing device can perform orientation processing based on a subsequent comparison of the changed characteristic to the at least one characteristic of the first device; and upon determining the video processing device can perform orientation processing, the transmitter is further configured to transmit a second message from the video processing device to the first device.

11. The video processing device of claim 10, wherein the at least one characteristic includes at least one of: a battery level, a central processing unit capability, a power source an orientation sensor capability, thermal conditions, transmission power, or communication session participant identifier.

12. The video processing device of claim 11, wherein the central processing unit capability includes clock cycles, chipset, memory rotation, thermal efficiency, operating system, or instruction set.

13. The video processing device of claim 10, wherein the orientation negotiation message is received prior to establishing the communication session.

14. The video processing device of claim 10, wherein the orientation negotiation message is received during the communication session.

15. The video processing device of claim 10, wherein the second message comprises an orientation re-negotiation message.

16. The video processing device of claim 10, wherein the first message comprises one of a session initiation protocol or a real time transport protocol message.

17. The video processing device of claim 10, further comprising a video coding processor configured to:

adjust an orientation of video data transmitted during the communication session based at least in part on the orientation of the first device and an orientation of the video processing device, when the video processing device is identified as the one to perform orientation processing; and bypass orientation processing of the video data transmitted during the communication session when the first device is identified as the one to perform orientation processing.

18. The video processing device of claim 17, wherein the video coding processor is configured to rotate one or more portions of the video data.

19. The video processing device of claim 10, further comprising at least one of a cellular telephone, a satellite telephone, a personal digital assistant (PDA), a mobile media player, a set-top box, a gaming console, a multimedia console, a digital video receiver, a digital video recorder, a digital camera, a tablet computer, a handheld gaming console, a laptop computer, or a desktop computer.

20. A video processing device comprising:
a memory storing specific computer-executable instructions; and
a processor coupled to the memory and configured to execute the specific computer-executable instructions to at least:
receive an orientation negotiation message from a first device associated with a communication session with the video processing device, the orientation negotiation message including an indication of an orientation of the first device and a first value indicating at least one characteristic of the first device;
obtain a second value indicating the at least one characteristic of the video processing device;
generate a first message identifying the video processing device or the first device as the one to perform orientation processing of video data transmitted and received by the video processing device and the first device during the communication session, wherein generating the first message is based at least in part on a comparison of first value to the second value and based on exceeding a threshold value associated with the first device;
transmit the first message to said first device; and
identify a change in the at least one characteristic of the video processing device during the communication session;
when the video processing device is not identified to perform orientation processing, determine whether the video processing device can perform orientation processing based on a subsequent comparison of the changed characteristic to the at least one characteristic of the first device; and
upon determining the video processing device can perform orientation processing, transmit a second message from the video processing device to the first device.

21. The device of claim 20, wherein the processor executes the specific computer-executable instructions to adjust an orientation of video data transmitted during the communication session based at least in part on the orientation of the first device and an orientation of the video processing device when the video processing device is identified as the device perform orientation processing.

22. A non-transitory computer-readable medium comprising instructions executable by a processor of a video processing device, the instructions, when executed by the processor, cause the video processing device to:
receive an orientation negotiation message from a first device associated with a communication session with the video processing device, the orientation negotiation message including an indication of an orientation of the first device and a first value indicating at least one characteristic of the first device;
receive a second value indicating the at least one characteristic of the video processing device;
identify the video processing device or the first device as the one to perform orientation processing of video data transmitted and received by the video processing device and the first device during the communication session, said identifying based at least in part on a comparison of the first value to the second value and based on exceeding a threshold value associated with the first device; and
transmit a first message to said first device, said first message including information indicating a result of said identifying;
identify a change in the at least one characteristic of the video processing device during the communication session;
when the video processing device is not identified to perform orientation processing, determine whether the video processing device can perform orientation processing based on a subsequent comparison of the changed characteristic to the at least one characteristic of the first device; and
upon determining the video processing device can perform orientation processing, transmit a second message from the video processing device to the first device.

23. The medium of claim 22, further comprising instructions causing the video processing device to:
adjust an orientation of the video data transmitted during the communication session based at least in part on the orientation of the first device and an orientation of the video processing device when the video processing device is identified as the one to perform orientation processing; and
bypass orientation processing of the video data transmitted during the communication session when the first device is identified as the one to perform orientation processing.

24. The method of claim 8, wherein adjusting the orientation of video data transmitted during the communication session comprises:
adjusting, by the video processing device, first video data based at least in part on the orientation of the first device prior to transmission of the first video data from the video processing device to the first device;
receiving, at the video processing device, second video data from the first device; and
adjusting, by the video processing device, the second video data based at least in part on an orientation of the video processing device.

* * * * *